(12) United States Patent
Brun

(10) Patent No.: US 6,857,769 B2
(45) Date of Patent: Feb. 22, 2005

(54) LIGHTING OR INDICATING DEVICE FOR A MOTOR VEHICLE

(75) Inventor: Norbert Brun, Bobigny Cedex (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 10/173,926

(22) Filed: Jun. 18, 2002

(65) Prior Publication Data
US 2002/0196641 A1 Dec. 26, 2002

(30) Foreign Application Priority Data
Jun. 26, 2001 (FR) .............................. 01 08447

(51) Int. Cl.$^7$ ................................ F21V 7/00
(52) U.S. Cl. .................. 362/517; 362/245; 362/247; 362/327; 362/543; 362/545
(58) Field of Search ................. 362/243, 245, 362/247, 327, 543, 545, 517, 800

(56) References Cited

U.S. PATENT DOCUMENTS

| | | | |
|---|---|---|---|
| 1,562,186 A | * 11/1925 | Homer et al. | ............... 362/517 |
| 4,949,226 A | 8/1990 | Makita et al. | ............... 362/61 |
| 5,353,203 A | * 10/1994 | Bertling et al. | ............. 362/243 |
| 5,997,163 A | 12/1999 | Brown | ........................ 362/553 |
| 6,540,387 B2 | * 4/2003 | Hashiyama et al. | ........ 362/247 |

FOREIGN PATENT DOCUMENTS

| | | |
|---|---|---|
| DE | 199 33 713 A1 | 1/2001 |
| EP | 0 942 225 A2 | 9/1999 |
| EP | 1 077 346 A2 | 2/2001 |

* cited by examiner

Primary Examiner—Stephen F Husar
(74) Attorney, Agent, or Firm—Morgan & Finnegan LLP

(57) ABSTRACT

The present invention relates to a lighting and indicating device for a motor vehicle, including at least one main light source, associated with a reflector in order to emit a light beam of predetermined photometry along an optical axis through glazing.

According to the present invention, the lighting or indicating device includes at least one second light source situated off the optical axis, and reflecting means for reflecting the light rays emitted by the second light source along a direction substantially parallel to the optical axis.

23 Claims, 2 Drawing Sheets

LIGHTING OR INDICATING DEVICE FOR A MOTOR VEHICLE

FIELD OF THE INVENTION

The present invention relates to lighting or indicating devices for motor vehicles, and more particularly those which are of the type including several functions.

BACKGROUND OF THE INVENTION

It is usual to bring several lighting or indicating functions together into a single housing, so as to simplify the electrical wiring for these various functions in a motor vehicle. Each function includes a light source, a reflector and possibly glazing, these various elements being configured to supply a lighting or indicating beam the geometric and photometric characteristics of which have to be in accordance with various regulations.

Each function thus requires a minimum amount of space for its installation in a particular lighting or indicating device. However, the amount of space available for installing lighting or indicating devices is more and more restricted both at the front and the rear of a modern motor vehicle. This is because the constraints of aerodynamics and the designs of the stylists lead to shapes which are often very different from those which result solely from technical considerations. It results therefrom that, in many cases, the space available for grouping together these functions into the same housing is inadequate, and that it is then necessary to distribute several functions into different housings, causing a rise in cost and an increase in wiring and assembly time.

The present invention falls into this context and its object is to propose a lighting or indicating device which makes it possible easily to make available a supplementary indicating and lighting function, such a lighting or indicating device having, moreover, to be simple to assemble, reliable in its operation, with photometric performance meeting the regulations in force, such a device having, moreover, to be inexpensive.

SUMMARY OF THE INVENTION

Hence the subject of the invention is a lighting and indicating device for a motor vehicle, including at least one main light source, associated particularly with a reflector, in order to emit a light beam of predetermined photometry along an optical axis through glazing.

According to the present invention, it includes at least one second light source situated off the optical axis, and reflecting means for reflecting the light rays emitted by the second light source along a direction substantially parallel to the optical axis.

According to other characteristics of the present invention:

the light rays emitted by the second source and reflected by the reflecting means form a light beam complying with a second predetermined photometry.

the reflecting means form a virtual image of the second source, which can be situated in the vicinity of a horizontal plane passing through the optical axis or in any other region within the device.

the reflecting means consist of the front face of a partially reflecting strip. This may take the form, for example, of a strip made of substantially transparent plastic (such as polymethylmethacrylate, PMMA, or polycarbonate, PC). Its thickness can vary from $1/10^{th}$ of a millimeter to 3 millimeters. This is because there is an advantage in choosing a relatively small thickness in order to limit the risk of a double-reflection phenomenon appearing. In fact, the strip can be chosen in such a way as to have luminous reflection lying between 5 and 60%, especially between 10 and 45%. At least one of its faces may have undergone a treatment in such a way as to modify this luminous-reflection level appropriately. This may take the form of a treatment by the deposition of a thin film or of a stack of thin films. It may, for example, take the form of a very thin, reflecting or partially reflecting film (an aluminum "flashing", etc.) or of a stack of thin films with alternately high and low refractive indices.

the rear face of the partially reflecting strip may have undergone an anti-reflection treatment;

a screen is arranged between the second light source and the glazing. In a more general way, it is preferred to arrange the second light source(s) in the device in such a way that it is or they are not visible when standing in front of the glazing of the said device. It is actually possible to use a screen of a size matching that of the light source and which is specific to it, to arrange the said source or sources "behind" an ad-hoc mask, etc, these reflecting means, especially including the partially reflecting strip mentioned above, are advantageously arranged in the device in such a way that they are arranged at least partially between the main light source and the secondary light source (or at least one of them if there are several): in the case of a semi-reflecting strip, it is thus preferred for all or part of this strip to be able to intercept the light beam emitted by the second light source, but also all or part of the light beam emitted by the main source, the second light source is a light-emitting diode;

the lighting or indicating device includes at least two main light sources each associated with a reflector in order to emit, through glazing, at least two light beams with predetermined photometries along at least two substantially parallel optical axes; and it includes at least one second light source situated out of the plane formed by the optical axes and reflecting means for reflecting the light rays emitted by the second light source along a direction substantially parallel to the optical axes;

the reflecting means consist of the front face of a partially reflecting strip arranged in front of the reflectors;

the reflecting means consist of the front face of partially reflecting strips each arranged in front of a reflector.

BRIEF DESCRIPTION OF THE DRAWINGS

Other aims, characteristics and advantages of the present invention will emerge clearly from the description which will now be given of an embodiment example, given in a non-limiting way by reference to.

DESCRIPTION OF THE PREFERRED EMBODIMENTS

Figure 1:
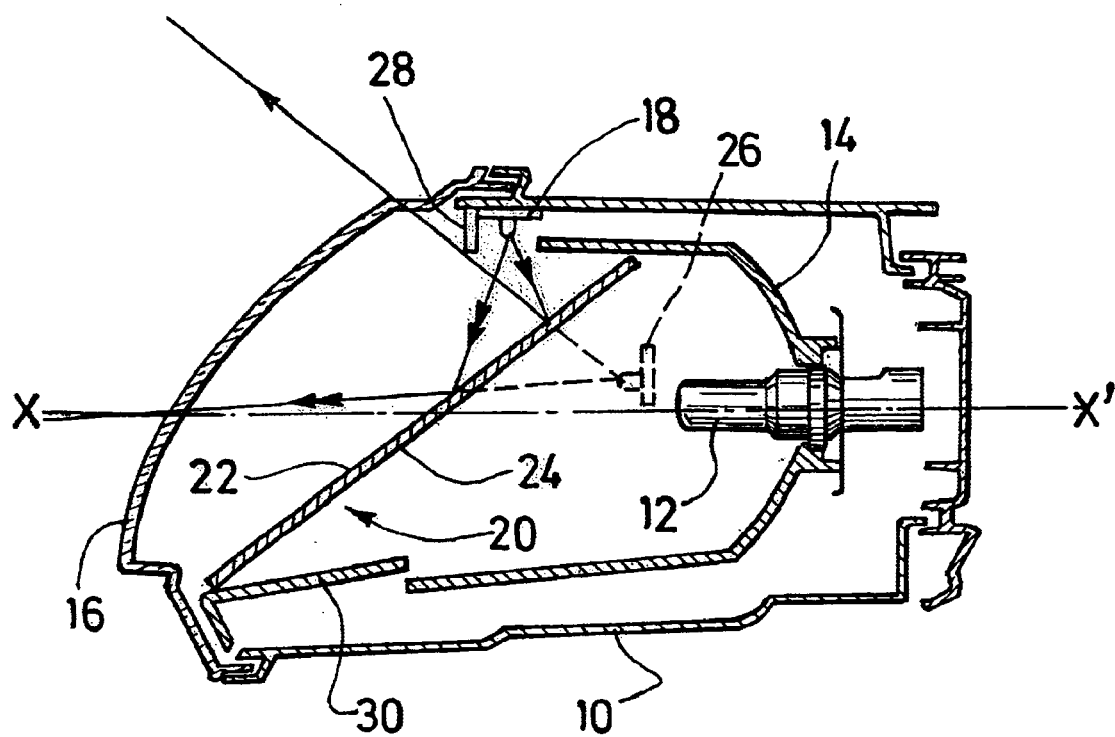
FIG. 1 represents a diagrammatic view in section of a lighting and indicating device produced in accordance with the present invention.

A lighting and indicating device, here a headlamp, is seen in the FIGURE, including, in a known way, in a housing 10, a main light source 12 and a reflector mirror 14. The light rays emitted by the source 12 are reflected by the mirror 14 towards enclosing glazing 16 in order to form a lighting or indicating beam directed along the optical axis X'–X of the lighting or indicating device. The reflector 14 and possibly the glazing 16 are produced in such a way as to confer on this beam a predetermined spatial distribution and photometry, thus producing a main beam or dipped beam, for example.

In accordance with the present invention, a second light source 18, for example a light-emitting diode, in the example represented in the FIGURE, is provided in the lighting or indicating device in order to fulfill a second function. The source 18 is situated off the optical axis X–X', being, for example, fixed to the housing 10. Reflecting means, such as a partially reflecting strip 20, are arranged facing the second light source in order to reflect the light rays emitted by the second light source 18 in the direction of the optical axis X–X' compatible with the light distributions necessary to comply with the regulations and to achieve the desired effect.

The partially reflecting strip is inclined on the optical axis X–X', so as to form a virtual image 26 of the second source 18 situated preferably in the vicinity of a horizontal plane passing through the optical axis X–X'. This strip is advantageously arranged between the two sources in such a way as to intercept their two light beams. It in fact "separates" the two sources.

When looking at the headlamp through the glazing 16, the impression is gained that the light beam emitted in reality by the source 18 originates from a light source which is "floating" behind the strip 20, the source 18 being completely hidden, which gives the headlamp a very aesthetic, very surprising effect. When the second light source is turned off it is no longer seen, and the overall effect on anyone looking through the glazing of the headlamp is a little like that of being in front of a glass with no mirror silvering.

The light rays emitted by the second source 18 and reflected by the partially reflecting strip therefore seem to originate from the virtual image of the second source 18, and form a light beam complying with a second predetermined photometry. For example, the beam generated by the main source 12 may be a dipped beam, and the beam generated by the second source 18 may comply with the photometry for a parking light, also called night light.

It is thus possible, for example, to obtain the parking light function in a lighting or indicating device, without increasing the size of it, nor modifying its reflector. When the parking lamp function is wanted, the second light source 18 is switched on, and it, by way of the partially reflecting strip 20, or more precisely of the front face 22 of this strip 20, supplies a light beam complying with defined regulations. A strip 20 possessing a reflection coefficient greater than 50% could be used in order to obtain the best results. It would be possible, moreover, to give the strip 20 an inclination on the optical axis such that the reflection which it will provide should be optimized. It would also be possible to use a strip 20 having flat parts and curved parts, so as to optimize the reflection of the light rays emitted by the second source and to arrange the virtual image of this second source at a predetermined spot.

When the dipped-beam function is wanted, the main source 12 is turned on, in order to supply the desired dipped beam. The light rays emitted by the main source 12 and reflected by the reflector 14 pass through the partially reflecting strip 20, the glazing 16, and form the regulatory dipped beam. This is because the partially reflecting strip applies no alteration to the light rays which pass through it other than a slight translation parallel to their initial direction, the magnitude of this translation being a function of the thickness of the strip 20. By choosing a strip of narrow thickness, this translation can be regarded as negligible.

In order to prevent stray reflections on the rear face 24 of the strip 20 being able to disturb the photometry of the final beam, it would advantageously be possible to make provision to have the rear face 24 of the partially reflecting strip 20 undergo an anti-reflection treatment. Thus, very few light rays will be absent from the final beam.

In order to disguise the second light source 18, it would be possible to arrange a screen 28, between it and the glazing 16, this screen not interfering with the light rays of the lighting function obtained via the lamp 12 nor with the light rays emitted by the second source 18 and reflected by the strip 20. Such an arrangement exhibits the advantage of disguising the second light source 18, even when it is turned off. The aesthetics of the lighting or indicating device are therefore not affected in any way by the presence of the light source 18.

It would be possible, advantageously, to make good use of the mask 30 already present in the lighting or indicating device, and used to mask the parts of the housing of the lighting or indicating device which might be visible between the reflector 14 and the glazing 16, in order to form the screen 28.

Thus, when the second light source 18 is turned on, all that is visible is its virtual image 26 in the partially reflecting strip 20. It is then possible to choose the location of this second light source 18, as well as the inclination of the partially reflecting strip 20, in order to give this virtual image 26 any location in the lighting or indicating device thus produced.

It would also be possible, in a lighting or indicating device including several reflectors such as 14, each associated with a light source such as 12 and arranged one beside the other in order to generate beams with different photometries, to install a partially reflecting strip 20 in such a way that it extends in front of all of these reflectors, and second light sources such as 18, in such a way that their virtual images are visible at predetermined spots, for example between two reflectors, that is to say at places where it is physically impossible to arrange a light source. It would be possible, for example, to install, in a lighting or indicating device, second colored sources, in such a way that their virtual images are not superimposed on those for existing functions so as to be visible when the existing functions are lit, in order, for example, to carry out the function of direction-change light indicator. Depending on the effect sought or the space available, it would be possible to arrange as many partially reflecting strips as there are second light sources, in such a way that their virtual images are situated at predetermined spots.

There has thus been produced, according to the present invention, a lighting or indicating device which makes it easily possible to install a supplementary lighting or indicating function without any alteration to the overall size of the lighting or indicating device. Such a lighting or indicating device is particularly simple, reliable and inexpensive, since it requires only the installation of one or more second light sources, of a partially reflecting strip, and possibly of a screen in order to achieve the purpose sought. Such a result makes it possible, furthermore, to obtain styling effects which the lighting or indicating devices of the prior art did not permit.

Figure 2:
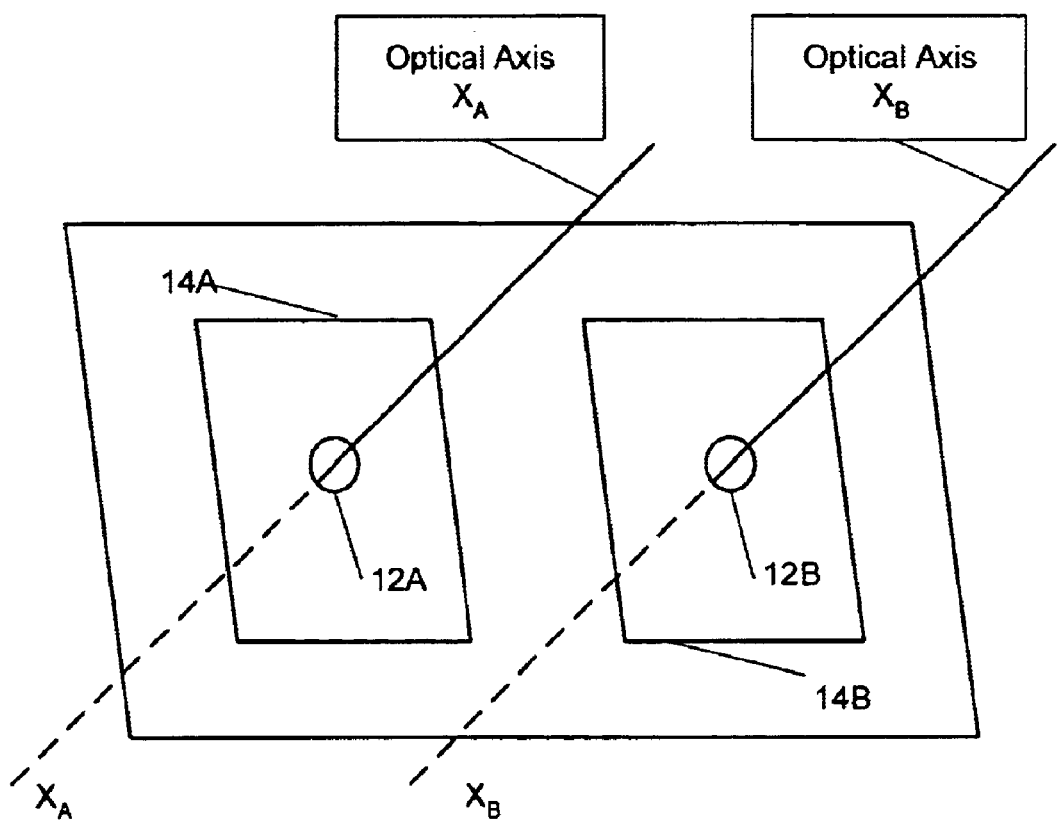
FIG. 2 illustrates a perspective schematic of an illustrative embodiment of the invention formed with two main light sources.

FIG. 2 illustrates a perspective schematic of an illustrative embodiment of the invention formed with two main light sources (the individual elements associated with each main light source are shown in greater detail in FIG. 1). As illustrated, FIG. 2 shows two main light sources 12A and 12B, wherein main light source 12A is disposed laterally with respect to main light source 12B. It is to be understood that the configuration of the elements in the invention, (e.g., the two main light sources) need not be limited to the configuration illustrated herein. The light sources 12A and 12B correspond to reflectors 14A and 14B, respectively. The elements in this embodiment of the invention are arranged such the main lights sources 12A and 12B also correspond to optical axes $X_A$ and $X_B$, respectively.

Needless to say, the present invention is not limited to the embodiments which have been described, but the person skilled in the art could, in contrast, apply numerous modifications to it which fall within its scope. Thus, for example, several second light sources could be used, by arranging them at predetermined spots in the lighting or indicating device so that their virtual images are arranged at predetermined spots. It would then be possible to arrange the second light sources in a particular pattern so that their virtual images are arranged according to this same pattern. Any simple geometric FIGURE could thus be produced. In this way it would also be possible, in place of light-emitting diodes, to use incandescent lamps, for example of the same type as those currently used to fulfill the parking-light function. Likewise, the partially reflecting strip could have a configuration other than flat, being curved, for example, its concavity being turned towards the front or towards the rear according to the desired effect.

What is claimed is:

1. Lighting an indicating device for a motor vehicle, including at least one main light source, associated particularly with a reflector, in order to emit a light beam of predetermined photometry along an optical axis through a glazing, wherein it includes at least a second light source situated off the optical axis, and a separate reflecting surface that reflects the light rays emitted by the second light source along a direction substantially parallel to the optical axis, wherein light from the at least one main light source passes through the separate reflecting surface.

2. Device according to claim 1, wherein the light rays emitted by the second source and reflected by the separate reflecting surface forms a light beam complying with a second predetermined photometry.

3. Device according to claim 1, wherein the separate reflecting surface forms a virtual image of the second source with the device, and particularly situated in the vicinity of a horizontal plane passing through the optical axis.

4. Device according to claim 3, wherein the separate reflecting surface comprises of the front face of a partially reflecting strip.

5. Device according to claim 4, wherein at least one of the faces of the partially reflecting strip has undergone a treatment by the deposition of a thin film or of a stack of thin films, especially with a reflecting, partially reflecting or anti-reflection function.

6. Device according to claim 1, wherein, a screen is arranged between the second light source and the glazing.

7. Device according to claim 1, wherein the separate reflecting surface is arranged at least partially between the main light source and the secondary light source, or at least one of them if there are several.

8. Device according to claim 1, wherein the second light source is a light-emitting diode.

9. Device according to claim 1, including at least two main light sources each associated with a reflector in order to emit, thorough glazing, at least two light beams with predetermined photometries along at least two substantially parallel optical axes, wherein it includes at least one second light source situated out of the plane formed by the optical axes and separate reflecting surface that reflects the light rays emitted by the second light source along a direction substantially parallel to the optical axes.

10. Device according to claim 9, wherein the separate reflecting surface comprises the front face of a partially reflecting strip arranged in front of the reflectors.

11. Device according to claim 9, wherein the separate reflecting surface comprises the front face of partially reflecting strips each arranged in front of a reflector.

12. Lighting an indicating device for a motor vehicle, including at least one main light source, associated particularly with a reflector, in order to emit a light beam of predetermined photometry along an optical axis through glazing, wherein it includes at least second light source situated off the optical axis, and reflecting means for reflecting the light rays emitted by the second light source along a direction substantially parallel to the optical axis, wherein the reflecting means form a virtual image of the second source with the device.

13. Device according to claim 12, wherein the light rays emitted by the second source and reflected by the reflecting means form a light beam complying with a second predetermined photometry.

14. Device according to claim 12, wherein the reflecting means consist of the front face of a partially reflecting strip.

15. Device according to claim 14, wherein at least one of the faces of the partially reflecting strip has undergone a treatment by the deposition of a thin film or of a stack of thin films, especially with a reflecting, partially reflecting or anti-reflection function.

16. Device according to claim 12, wherein, a screen is arranged between the second light source and the glazing.

17. Device according to claim 12, wherein the reflecting means are arranged at least partially between the main light source and the secondary light source, or at least one of them if there are several.

18. Device according to claim 12, wherein the second light source is a light-emitting diode.

19. Device according to claim 12, including at least two main light sources each associated with a reflector in order to emit, thorough glazing, at least two light beams with predetermined photometries along at least two substantially parallel optical axes, wherein it includes at least one second light source situated out of the plane formed by the optical axes and reflecting means for reflecting the light rays emitted by the second light source along a direction substantially parallel to the optical axes.

20. Device according to claim 19, wherein the reflecting means consist of the front face of a partially reflecting strip arranged in front of the reflectors.

21. Device according to claim 20, wherein the reflecting means consist of the front face of partially reflecting strips each arranged in front of a reflector.

22. The reflecting means of claim 12, wherein said reflecting means is particularly situated in the vicinity of a horizontal plane passing through the optical axis.

23. Lighting an indicating device for a motor vehicle, including at least one main light source, associated particularly with a reflector, in order to emit a light beam of predetermined photometry along an optical axis through glazing, wherein it includes at least second light source situated off the optical axis, and a separate reflecting surface that reflects the light rays emitted by the second light source along a direction substantially parallel to the optical axis, wherein the separate reflecting surface forms a virtual image of the second source with the device, and particularly situated in the vicinity of a horizontal plane passing through the optical axis.

* * * * *